United States Patent [19]

Ishida et al.

[11] 4,320,964
[45] Mar. 23, 1982

[54] IMAGE FORMATION APPARATUS

[75] Inventors: Masato Ishida, Yokohama; Katsuyoshi Maeshima, Tokyo; Hisashi Sakamaki, Yokohama, all of Japan

[73] Assignee: Canon Kabushiki Kaisha, Tokyo, Japan

[21] Appl. No.: 53,088

[22] Filed: Jun. 28, 1979

[30] Foreign Application Priority Data

| Jun. 30, 1978 | [JP] | Japan | 53-79307 |
| Jul. 6, 1978 | [JP] | Japan | 53-82273 |
| Jul. 6, 1978 | [JP] | Japan | 53-82274 |
| Jul. 6, 1978 | [JP] | Japan | 53-82275 |
| Jul. 6, 1978 | [JP] | Japan | 53-82276 |
| Jul. 6, 1978 | [JP] | Japan | 53-82277 |
| Jul. 20, 1978 | [JP] | Japan | 53-82682 |

[51] Int. Cl.³ .................................... G03B 27/73
[52] U.S. Cl. ....................... 355/69; 355/83; 315/307
[58] Field of Search .................. 355/67–71, 355/83; 315/194, 199, 291, 307

[56] References Cited

U.S. PATENT DOCUMENTS

| 3,742,295 | 6/1973 | Irie | 355/69 X |
| 3,884,576 | 5/1975 | Mochimaru et al. | 355/69 |
| 3,898,006 | 8/1975 | Kimura et al. | 355/69 |
| 4,080,061 | 3/1978 | von Stein et al. | 355/38 |

Primary Examiner—L. T. Hix
Assistant Examiner—W. J. Brady
Attorney, Agent, or Firm—Fitzpatrick, Cella, Harper & Scinto

[57] ABSTRACT

An image formation apparatus includes a processing station for forming an image on a recording medium, input device for setting the density of the image formed on the recording medium to a desired value; a controller for controlling the power supplied to the process station in response to the input device setting to form the image of the desired density set by the input device; and a range-shifter for shifting the range of the power controllable by the controller to maintain the density substantially constant.

25 Claims, 27 Drawing Figures

IMAGE FORMATION APPARATUS

BACKGROUND OF THE INVENTION

1. Field of the Invention

This invention relates to an image formation apparatus such as a copying machine or the like.

2. Description of the Prior Art

Copying machines use, as the light source for exposure, halogen lamps, fluorescent lamps, mercury lamps, xenon tubes, etc. In electrophotographic copying machines, fluorescent lamps and halogen lamps are most popular. To obtain copies of proper density, the charging, exposure and developing means must be individually adjusted because the conditions of these means have relations with the quality of copies. However, it is difficult for the user to adjust the charging and the developing means. Therefore, it has usually been the practice that the conditions of the charger and the developing device are fixed or may be adjusted only by experts such as service men and copies of good quality are obtained by varying the exposure amount in accordance with the conditions (for example, diazo and colored characters) of the image original, namely, adjusting the brightness of the optical image on the surface of a photosensitive medium.

There are the following two methods of adjusting the exposure amount:

a. to mechanically change the diaphragm blade.

b. to electrically vary the brightness of the light source itself.

The method a. has heretofore been often used because, in this method, it is entirely unnecessary to vary the quantity of light of the light source itself. A disadvantage of this method is that it requires a large space because of its being of a mechanical type, which in turn has led to the great complexity of the mechanical construction and difficulties in the adjustment thereof. Further, the lamp always puts out its maximum quantity of light and requires a maximum electrical power even when the exposure amount is small. This means great loss of the electrical power and shorter life of the light source. The method b., which comprises varying the brightness of the light source itself by varying the electrical power applied to the light source, requires the applied voltage to be varied. These are various methods of varying the voltage, such as the conduction phase adjustment, the adjustment effected with a variable voltage type auto-transformer opened, and the like, but owing to the recent remarkable advancement of the semiconductor technique, it has become possible to provide compact, simple and long-lived devices by using highly stabilized semiconductor control elements of high performance (triacs).

In this latter method, however, even when one thinks that one has adjusted the quantity of light to a predetermined level, the actual quantity of light (the density of the reproduced image) becomes irregular due to differences in environment, temperature and element characteristic and, where it is desired to finely adjust the predetermined quantity of light, a very cumbersome procedure and technique has been required of the operator.

In the recent copying machines, halogen lamps have become used as the light source for exposure, but the illumination of a halogen lamp is varied in proportion to about the cube of the applied voltage and therefore, when the voltage applied to the heater of the fixing device has been dropped by temperature control, it affects the halogen lamp. The usual halogen lamp requires a rising time of the order of 300 mS until its illumination reaches a predetermined value when the rated voltage for the lamp is applied thereto. Accordingly, fog may be created if copying is started with such rising time neglected. Moreover, if it is attempted to turn on the lamp with a low illumination by applying thereto a voltage below the rated voltage, more time will be required before the lamp reaches the desired illumination. Therefore, the timing for the exposure of the original must be determined in accordance with the low illumination turn-on which is slowest in rising. This leads to the need of the waiting time from the starting of the copying till the starting of the exposure of the original, which after all means a slower copying speed.

Further, irregularity of the rising time of the lamp itself resulting from the characteristic irregularity of the environmental conditions such as temperature and humidity, irregularity of the velocity of movement of the optical system and the original carriage, and irregularity of the sensitivity of the photosensitive medium attributable to its quality and environmental conditions—coact such that the electrostatic latent image corresponding to the end of the original is not formed appropriately and fog is sometimes created on the end of the copy image. If a waiting time is provided to compensate for the irregularity of the rising time, the copying speed becomes slower and slower to elongate the time required for the repeated copying.

Also, when copies are desired in haste, the operator often fails to confirm the position of the dial or effects the copying through wrong operation of the apparatus to produce useless copies of unsuitable density. Further, when the adjustment of the exposure is effected by adjusting the electrical power supplied to the light source, the color temperature of the light source may be varied and this, coupled with the spectral characteristic of the sensitivity of the photosensitive medium, has offered problems in image formation.

In an image formation apparatus using a short focus small image forming element array as the image forming optical system, it is actually very difficult or impossible to incorporate means such as a diaphragm blade in the image forming optical system, and it is extremely difficult to precisely limit the light flux between the original to be copied and the short focus small image forming element array or between such array and the photosensitive medium because the width of the effective light flux contributing to the image formation is very narrow, and thus it tends to cause deterioration of the quality of the copy image.

Also, in a copying machine of the variable magnification type, for example, the correction of the exposure amount when the magnification has been changed becomes a problem. For example, if reduced scale copying is effected at a magnification $n_2$ only with the lens, etc. moved after copying has been effected at a magnification $n_1$ and under a proper exposure, the then exposure amount will become excessive and readjustment will be required in order to provide a proper exposure amount.

Also, to obtain proper copies at each copying magnification, adjusting means for use by the operator becomes necessary for varying the quantity of light in accordance with the conditions (e.g. diazo and colored characters) of the original to be copied.

However, in a copying machine of the variable magnification type, the position of the lens is displaced in accordance with the change of the copying magnification and therefore, not only the construction for varying the diaphragm blade becomes very complex but also the mechanical construction for indenpendently adjusting the amount of correction in each magnification becomes complicated.

SUMMARY OF THE INVENTION

It is an object of the present invention to eliminate the above-noted disadvantages and to provide an image formation apparatus having the function of adjusting the density of reproduced image.

It is another object of the present invention to provide an image formation apparatus which enables delicate adjustment of the density of reproduced images to be accomplished by the adjustment of the electrical power applied to process elements.

It is still another object of the present invention to provide an image formation apparatus which can easily and delicately calibrate the relation between preset means for adjusting the density and the actual density.

It is yet still another object of the present invention to provide an exposure (amount) control device which can delicately adjust the quantity of light of a lamp.

It is a further object of the present invention to provide an exposure (amount) control device which can easily and delicately calibrate the relation between means for manually adjusting the quantity of light of a lamp and the actual quantity of light.

It is also an object of the present invention to provide an image formation apparatus which can reduce the preparatory operation for the image formation to thereby quicken the time for starting the image formation.

It is a further object of the present invention to provide an image formation apparatus in which excess turn-on operation of the lamp for exposure is minimized during the intervals of repeated copying.

It is a further object of the present invention to provide an exposure control device which can quicken the rising to the adjusted quantity of light at the start of the turn-on of the lamp irrespective of the adjustment to the low or high quantity of light.

It is a further object of the present invention to provide an exposure control device which can quicken the rising to the adjusted quantity of light without using wasteful energy.

It is a further object of the present invention to provide an image formation apparatus in which the density adjustment of reproduced images and the maintenance of the adjusted density can be accomplished easily.

It is a further object of the present invention to provide an image formation apparatus in which adjustment of malfunctioning due to improper operation of the adjusting means which is liable to result from the easier density adjustment of reproduced images may be prevented.

It is a further object of the present invention to provide a copying machine having a plurality of magnifications and a color copy mode and capable of effecting copying in a predetermined mode and in which reproduced images may be formed at a predetermined density irrespective of selection of the copy mode.

The present invention has an exposure lamp, means for adjusting the quantity of light of the exposure lamp, and means for maintaining substantially constant the range of adjustment of the quantity of light which can be adjusted by the said adjusting means while varying the central quantity of light of said adjustment range.

The present invention further has control means for maintaining constant the quantity of light adjusted by said adjusting means, and further has allowance means for making allowance for the said adjustment range. The invention further has means for shortening the time from after the start of exposure until the lamp reaches a predetermined quantity of light and for enabling the time adjustment to be accomplished manually or automatically.

Thereby, the present invention makes the adjustment of the quantity of light easy to do and does not harm the adjustment range by fine adjustment. If the turn-on voltage of the lamp is lower than the rated voltage of the lamp, the rising to a predetermined illumination will be correspondingly delayed and the use of such a light source as the copy exposure source will slow down the copying speed, but such a disadvantage may be eliminated by the present invention.

According to the present invention, in a predetermined time after completion of the copying, the amount of electrical power to the lamp adjusted by a key is shifted to the adjusted amount for standard exposure and the adjustment of the quantity of light is inhibited during the exposure. Further, there is provided an indicator such as a light-emitting diode for indicating the adjusted amount, and a filter for eliminating the infrared rays to correct the color temperature is inserted in the exposure path.

The present invention does not harm the quality of copy images but enables precise adjustment and fine adjustment of the exposure in a copying apparatus using a small image forming element array.

Also, according to the present invention, the process start such as the time for starting to turn on the light source or the time for starting the exposure by the light source is controlled in accordance with the amount of adjustment of the density or quantity of light, or the voltage applied to the light source is controlled to compensate for the rising time required from after the starting of the turn-on of the light source until the light source reaches a predetermined quantity of light, in accordance with the amount of adjustment; for example, a high potential such as the rated potential which differs from the adjusted potential is applied to the light source for a time corresponding to the amount of adjustment, or a high potential different in accordance with the amount of adjustment is applied to the light source for a predetermined time.

The invention will become more fully apparent from the following detailed description thereof taken in conjunction with the accompanying drawings.

DESCRIPTION OF THE PREFERRED EMBODIMENTS

Figure 1:
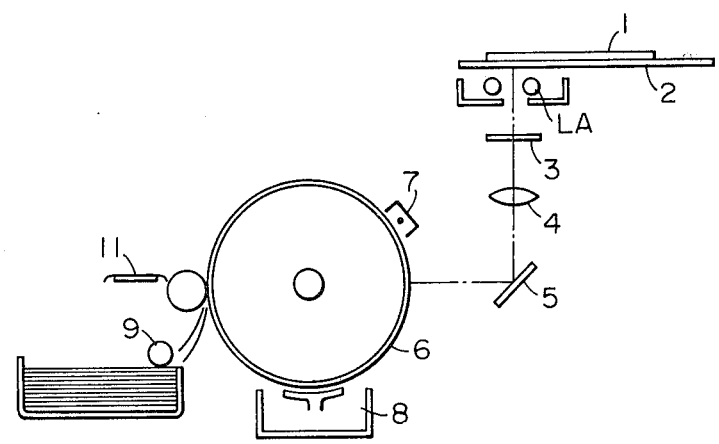
FIG. 1 is a schematic cross-sectional view of a copying machine to which the present invention is applicable.
Figure 2:
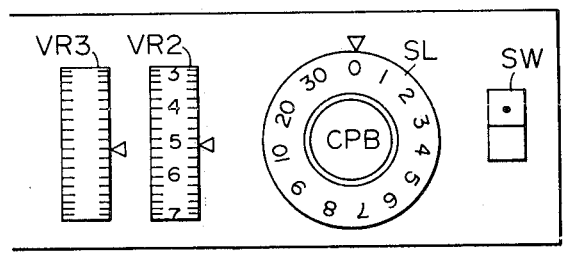
FIG. 2 is a plan view of the operating portion of the FIG. 1 copying machine.

FIG. 1 is a schematic cross-sectional view of a copying machine to which the present invention is applicable, and FIG. 2 is a plan view of the operating portion of the FIG. 1 apparatus.

An original 1 is placed on an optical system platen 2. When a copy button CPB is depressed after the exposure amount of a lamp has been rendered to a required value by adjusting an exposure dial VR2 (FIG. 2), a switch SW (FIG. 3) is closed to turn on a lamp LA. The reflected light from the original 1 by the lamp LA passes through a filter 3, to be described, which cuts infrared rays (cuts the light other than the visible light), and further through a lens 4 and via a mirror 5 and is projected upon a photosensitive medium 6. The exposure is effected by the reciprocal slit scanning of the platen 2. The surface of the photosensitive medium 6 is already uniformly charged by a corona charger 7, so that an electrostatic latent image is formed on the surface of the photosensitive medium by said exposure. The electrostatic latent image is developed into a visible image by a developing device 8, and then the developed image is transferred onto paper 9, which is then fixed by a fixing device 11 and discharged outwardly of the machine, thus providing a required copy.

A variable resistor VR2 is disposed as an exposure dial in the operating panel portion of the copying machine. A variable resistor VR3 is adjusted so that a proper value may be provided at the center value of the exposure dial. By this variable resistor VR3, it is possible to correct chiefly the irregularity of the lamp LA including the irregularities of elements C, Q2 and Q1 or correct such irregularity in accordance with the sensitivity of the photosensitive medium and where there is not such variable resistor VR3, there is no proper relationship between the value of the exposure dial and the light and shade of the reproduced image.

The lamp LA, which is a halogen lamp, is automatically controlled so that it provides a predetermined quantity of light even if the quantity of light of the lamp is varied by a variation in the voltage applied to the lamp. The filter 3 is provided to correct the color temperature of the lamp which is variable when the exposure is adjusted.

Figures 3A, 3B:
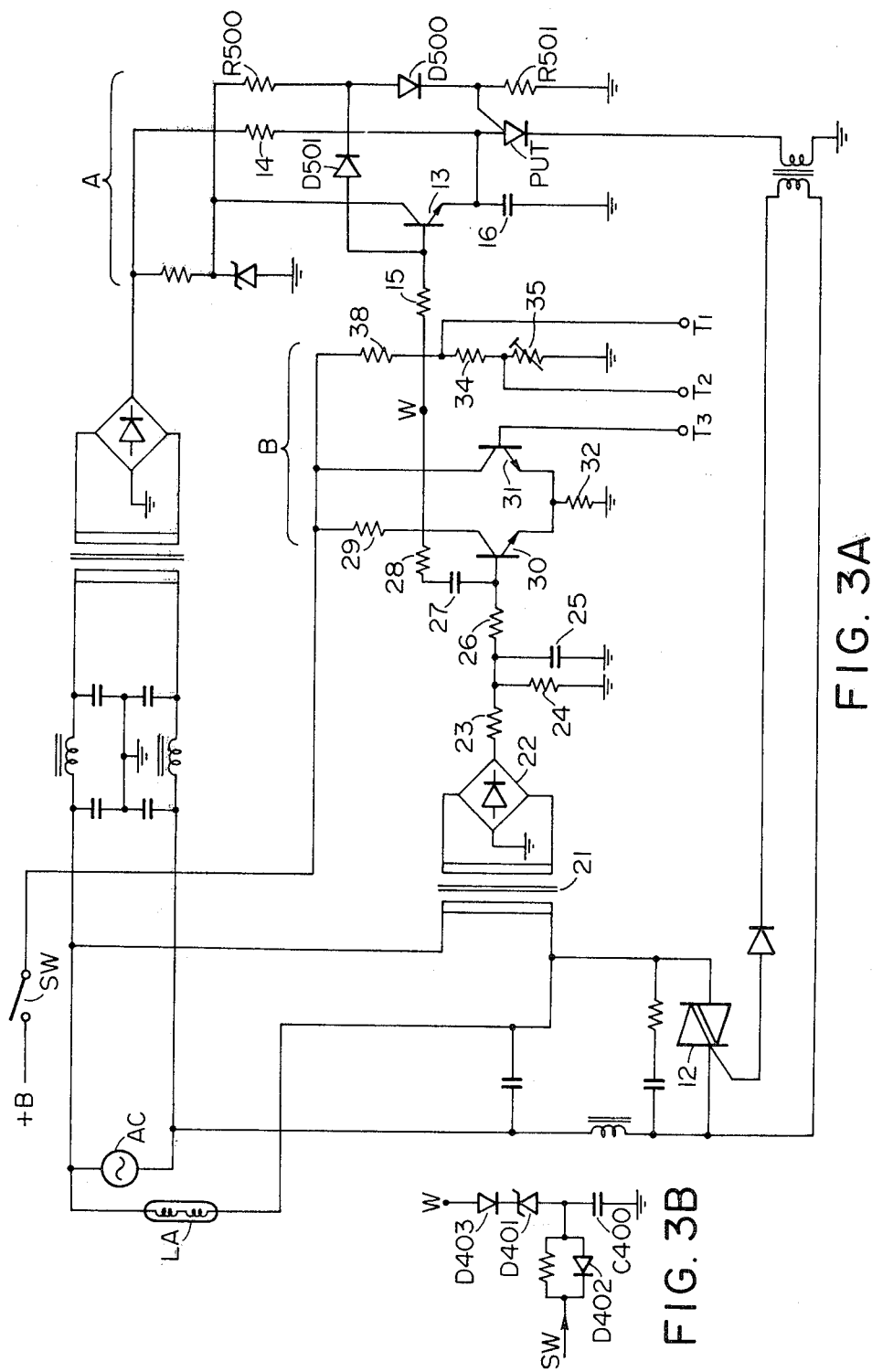
FIGS. 3A, 3B, 4 and 6 diagrammatically show the exposure control circuit in the present invention.
Figure 4:
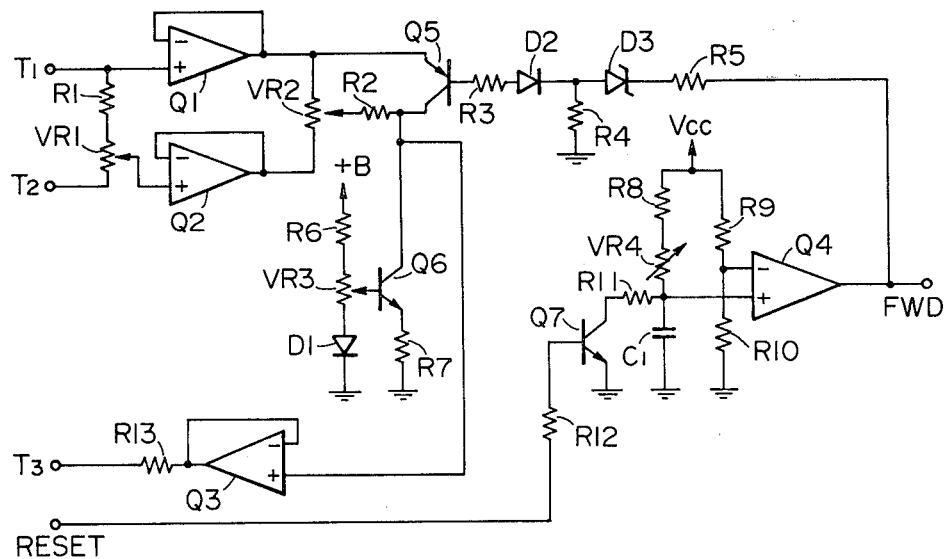

FIGS. 3A and 3B and FIG. 4 show an example of the circuit of the lamp illumination control device according to the present invention. The portion within a frame A is a phase control circuit for controlling the ignition angle of a bidirectional control element 12 by the use of an N gate thyristor (PUT) and for keeping the effective value of the AC voltage applied to the lamp LA at a predetermined value. The ignition angle is determined by the output of a differential amplifier B which compares the terminal voltage of the lamp LA with a predetermined value to detect an error therebetween, and a line voltage applied to the anode terminal of the PUT through a resistor 14. Designated by D500, D501, R500 and R501 are elements for determining the gate voltage of the PUT.

The differential amplifier B will now be described. Transistors 30 and 31 have their emitters connected in common to each other, and are grounded from the junction therebetween through a resistor 32. The collector of the transistor 30 is connected to a power source through a resistor 29, a variable resistor 37 and a capacitor 36, and the collector of the transistor 31 is directly connected to the power source B. The base of the transistor 31 is connected to a constant potential point T3 which is provided by the adjusting circuit of FIG. 3 connected to T1, T2 and T3. The voltage applied to the lamp LA may be varied by a variation in the voltage applied to T3. On the other hand, in order to detect the terminal voltage of the load 3, an error signal is applied to the base of the transistor 30 through a resistor 26, said error signal being obtained by rectifying the output of an error detecting transformer 21 connected to the lamp LA by means of a diode bridge 22, voltage-dividing the rectified output by resistors 23 and 24, and then removing a pulsating component therefrom to a certain extent by a capacitor 25. Between the base and the collector of the transistor 30, there is provided a feedback path comprising a serial connection of a capacitor 27 and a resistor 28. This feedback path is inserted to remove the pulsating component to such an extent as not to adversely affect the subsequent operations where use is made of a capacitor 25 having such a degree of capacity as not to aggravate the transient response characteristic.

The ignition phase angle of the bidirectional control element 12 is determined by the pulse obtained from the PUT, and the phase relation between such pulse and the frequency of the AC power source AC is varied by the current charging a capacitor 16, namely, by the sum of a current amplified by $\beta$ times by a transistor 13 and a current flowing through the resistor 14.

Considering a case where the voltage across the lamp LA has become lower than a standard voltage by some reason or other, the voltage at the output end of the diode bridge 22 is reduced and the base current of the transistor 30 is decreased, so that the collector current of this transistor is decreased because the transistor 30 forms a differential amplifier with the transistor 31 whose base potential is held down to a predetermined level, and accordingly the collection potential of the transistor 30 rises and approaches the DC power source voltage. This increases the current flowing through a resistor 15 and the emitter current of the transistor 13, thereby shortening the time of each AC half period during which a capacitor 16 is charged to a potential necessary to turn on the PUT. That is, the phase of the ignition pulse advances, and the bidirectional control element 12 conducts earlier by a half period each than in the original case, whereby the terminal voltage of the load 3 rises and approaches the standard voltage. When the lamp voltage has become high, the reverse operation takes place. In this manner, the voltage determined by the port T3 is imparted to the lamp and maintained, and accordingly, the lamp keeps a predetermined level of brightness to ensure latent image formation and development thereof at a predetermined density.

FIG. 4 shows an adjusting portion of the exposure control circuit according to the present invention. In FIG. 4, T1-T3 are connected to T1-T3 in FIG. 2. Q1-Q3 are operational amplifiers and known as voltage followers in which the input voltage is coincident with the output voltage and the input impedance is high while the output impedance is low. Q4 is a comparator circuit. VR2 is a variable resistor for setting the amount of exposure which is connected to the output side of the operational amplifiers Q1 and Q2. VR3 is a variable resistor for finely adjusting the amount of exposure set by the VR2. VR1 is a variable resistor for determining the voltage range adjustable by the VR2. The variable resistor VR1 is connected to the base of a transistor Q6. A capacitor C1, resistors R8-R10 and a variable resistor VR4 together constitute a delay circuit. Q7 is a transistor for discharging the charge of the capacitor C1.

Operation will now be described. When a main switch SW is closed, a potential determined by the variable resistors VR1, VR2 and VR3 is applied to the input of the operational amplifier Q3 by the voltage application to T1 and T2, and the potential is momentarily put out from T3. However, during the closing of the main switch, a potential determined by the resistors R9 and R10 is applied to the minus input terminal of the comparator Q4 and the potential of the capacitor C1 is applied to the plus input terminal of the comparator Q4, so that the potential at T3 becomes as follows. That is, after the closing of the main switch, the capacitor C1 is charged by the time constant of VR4, R8 and C1 and the potential of the C1 gradually rises. The comparator Q4 puts out O while the potential at its plus input is lower than that at its minus input. Therefore, the delay time transistor Q5 is turned on, so that the potential applied to T1 is applied to the input of the amplifier Q3 and thus, the output terminal T3 thereof puts out a potential T1 which is higher than the potential determined by VR1, VR2 and VR3. After the delay time, when the plus input potential of the comparator Q4 becomes higher than the minus input potential thereof due to the charging of C11, the comparator Q4 puts out 1. Therefore, the transistor Q5 is turned off and the output T3 of the operational amplifier Q3 puts out the previously mentioned potential determined by VR1, VR2 and VR3.

Thus, during the time of the time constant determined by R8, VR4 and C1, a high potential to turn on the lamp at the rating is put out from T3 and thereafter, the potential set by VR2 is put out, so that the rising of the lamp is improved and after a predetermined time, the lamp shifts to its turn-on operation for emitting a predetermined quantity of light and therefore, the machine can quickly shift to the copy forming operation at a desired density. Also, by adjustment of VR4, the time for changing over the output from T3 can be adjusted.

When it is attempted to turn on the lamp at a voltage below the rating adjusted by VR2, the rising to the adjusted quantity of light is longer than the rising to the rated quantity of light during the turn at the rating, but the rated voltage is initially applied also during the adjustment by VR2 and therefore, the rising to the adjusted quantity of light is conversely shorter than that during the rating. It is thus possible to minimize the rising correction time by adjustment of VR4. Since the rising correction is not effected by initially applying a voltage higher than the rating, the life of the lamp is never reduced.

Herein, design is made such that when the potential at T3 is equal to the potential at T1, the rated voltage (100 V) is applied to the lamp and that when the potential at T3 is equal to the potential at T2, 30% of the rated voltage is applied to the lamp. It is preferable to provide the soft start circuit of FIG. 3B to prevent an AC voltage from being applied to the lamp at the moment when the switch SW is closed. Designated by C400 is a short capacitor, and denoted by D403 and D402 are charging-discharging diodes.

Adjustment of the quantity of light will now be described. When the variable resistor VR1 is adjusted, it is possible to vary the voltage to the plus input of the operational amplifier Q2 and vary the potential difference between the outputs of the operational amplifiers Q1 and Q2. By this, it is possible to vary the potential range settable by the variable resistor VR2, and the range of adjustment of exposure is limited. The variation in that range remains unchanged in whatever position the adjusted VR2 may be or even when the lamp is in its predetermined turned on state after the closing of the main switch.

Figure 23:
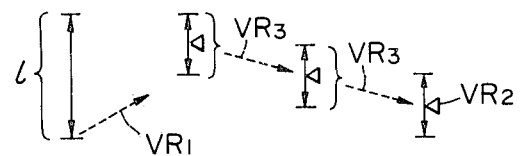
FIG. 23 illustrates the operation of the circuit of FIGS. 4 and 6.

If VR3 is varied with VR1 and VR2 adjusted, the current flowing through the transistor Q6 is varied to thereby vary the potential drop of the resistor R2. If the resistance value of this resistor R2 is kept sufficiently greater than the resistance value of the variable resistor VR2, the potential drop attributable to the variable resistor VR2 may be made negligible. Accordingly, only the variation in potential drop attributable to the resistor R2 affects the output of T3, whereby it is possible to level-shift this range by adjustment of VR3 without varying the adjustment range set by VR1. The level shift can also be effected without varying the central position of VR2. This is shown in FIG. 23. In FIG. 23, l is the range of the T3 voltage adjustable by the operator. Here, the lower limit voltage is increased by VR1, but the upper limit may be dropped.

Designated by D1 is a diode provided to compensate for the temperature of the transistor Q6, and denoted by D2 and D3 are diodes provided for the reverse voltage withstanding of the transistor Q5. VR1, VR3 and VR4 may be provided on the circuit base plate within the machine so as to avoid the complexity of the operating portion. Also, reset signal R for turning on the transistor Q7 is applied when the lamp is turned off.

A smaller capacity of a capacitor 27 with respect to a capacitor 25 contributes to further shortening of the rising time. The charging current flowing through resistors 29 and 28 is reduced by the closing of the switch SW, so that the collector current of a transistor 30 is reduced. Thus, the time until the transistor 30 enters its active area is elongated and accordingly, in the meantime, the bidirectional control element 12 conducts substantially without effecting the phase control due to the quick charging of a capacitor 16 based on the collector voltage approximate to the DC power source voltage B, and can supply a correspondingly great deal of power to the load 3 at the initial stage.

If a capacitor and a variable resistor are connected in series with each other but parallel to a resistor 29, the initial impedance during the closing of the switch SW may be varied by that variable resistor, thereby varying the time until the transistor 30 reaches its active area. In the initial state, this series circuit greatly affects the resistor 29, but in the steady state, it provides a great impedance which does not affect the amplifier. Consequently, it becomes also possible to effect strong exposure in the initial stage and form a black-and-white image on the leading end of paper.

As has so far been described, in the present embodiment, the central level of the adjustment range is shiftable up and down without varying the range in which the quantity of light is adjustable, so that the adjustment of the quantity of light becomes very easy and this is particularly effective in an apparatus wherein the quantity of light of the lamp is varied by adjusting the power or in an automatic control system wherein the quantity of light of the lamp is maintained constant. Further, the present embodiment corrects the delay of the turn-on rising time when the lamp is turned on at a voltage below the rated voltage of the lamp with the quantity of light adjusted, and can therefore maintain constant the time for starting the work such as copy process associated with the exposure, and can prevent the reduction in the speed of the process using adjustment of the lamp.

Figure 6:
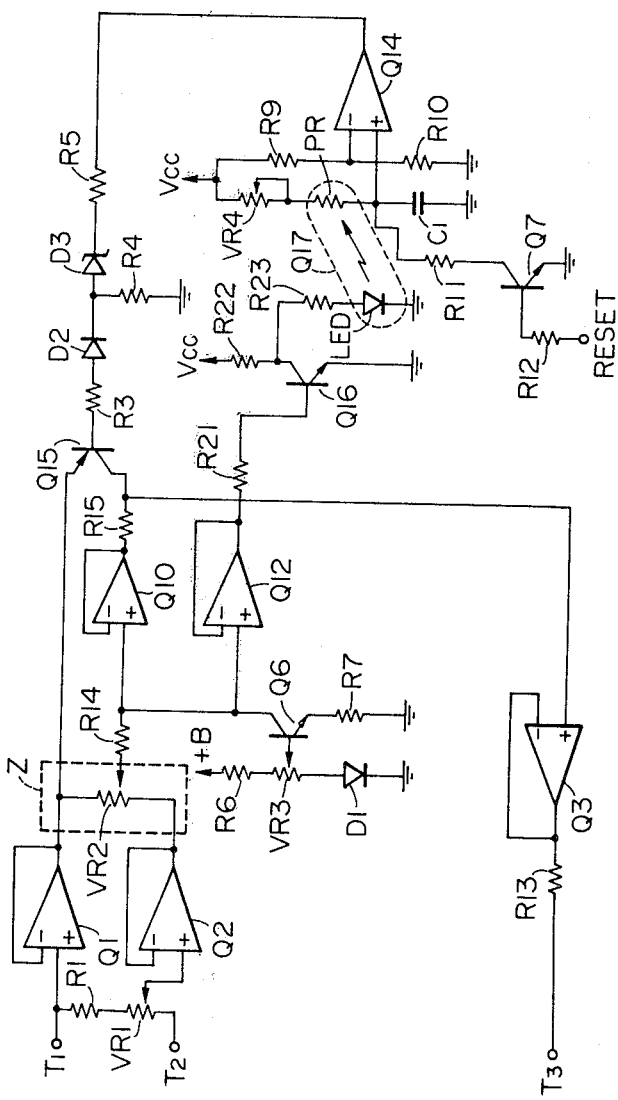

FIG. 6 shows an example of the circuit for automatically controlling the time during which the rated voltage for compensating for the rising in accordance with the quantity of light adjusted by VR2. Q10 and Q12 are operational amplifiers similar to Q1 and Q2, Q16 is a transistor for turning on a light-emitting diode LED, and Q17 is a photocoupler constituted within a single case by the LED and a photoresistor PR inserted in the delay circuit. The other elements correspond in reference character and function to those shown in FIG. 4.

When the switch SW is closed to supply power to the circuit, the amplifier Q12 detects the collector potential of the transistor Q6. That is, the amplifier Q12 detects the potential corresponding to the adjusted lamp potential set by the variable resistors VR1, VR2 and VR3 (absolute potential) and produces an output. During the steady turn-on of the lamp, if the output voltage from T3 by the adjustment of the VR2 is made smaller, the collector potential of the Q6 becomes lower. Thus, the output of the Q12 is low and the quantity of current flowing through the transistor Q16 is small. Consequently, the quantity of light of the light emitting diode LED is great. Since a resistor PR such as CdS or the like is inversely proportional to the quantity of current in the LED, the resistance value thereof becomes lower as the amount of adjustment of the VR2 is smaller. Therefore, the voltage at the plus input of the comparator circuit Q4 reaches the standard voltage of the minus input in a short time after the turn-on has been started. Consequently, the time during which the output of the Q14 is varied from its low level to its high level for turning off the transistor Q15 can be shortened correspondingly to the low adjustment of the quantity of light by the VR2.

Conversely, if the output from T3 is made greater by adjustment of the VR2 to thereby increase the exposure amount, the amount of operation of the transistor Q16 is increased to reduce the quantity of light emitted by the LED. Consequently, the resistance value of PR at the photocoupler is increased to elongate the time required for the predetermined potential of the plus input of Q4 to be reached. Thus, the time until the Q15 is turned off is elongated to enable securing a sufficient time required for the turn-on rising of the lamp.

When the adjustment of the quantity of light is small, if the rated voltage is applied to the lamp within the delay time for the correction of the turn-on rising, the set quantity of light may be achieved earlier than when the adjustment of the quantity of light is great, and therefore, when the lamp is turned on with a low illumination, the waiting time for the rising can be made shorter than when the lamp is turned on with the rated illumination. Accordingly, the other circuit constants are set such that the output of the comparator Q14 is changed over in a lesser rising time when a low adjustment of the quantity of light is effected and that the output of the comparator Q14 is varied with the rising time fully compensated for when a high adjustment of the quantity of light is effected.

Figure 9:
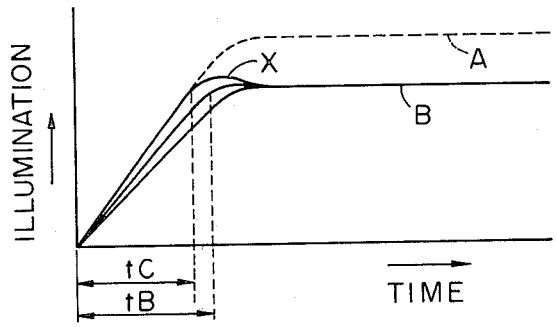
FIG. 9 is a graph illustrating the rising characteristic of a lamp.

Incidentally, when a voltage required for an illumination A higher than an illumination B is initially applied in order to obtain the illumination B as shown in FIG. 9, overshoot may sometimes take place as indicated at X in FIG. 9 and if the exposure scanning is started to form a reproduced image after a time tc, there occurs partly the while-removal due to the intense light resulting from the overshoot. It is therefore necessary to select the circuit constants of FIGS. 3, 4 and 6 or to select the times tc and TR, in order to prevent overshoot or to intentionally create the overshoot.

Where the load LA is a fluorescent lamp, it is preferable to operate the circuit B by directly detecting the brightness by a photodiode or the like instead of detecting the variation in light by 21 and 22 in FIG. 3. In that case, stable control becomes possible by controlling the voltage applied to the fluorescent lamp by means of a triac 12.

Figure 5:
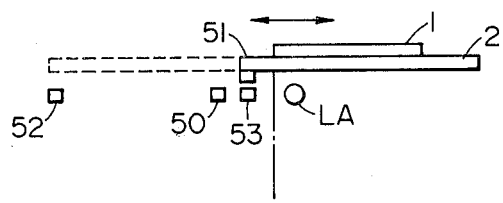
FIG. 5 is a fragmentary cross-sectional view of the FIG. 1 copying machine.
Figure 7:
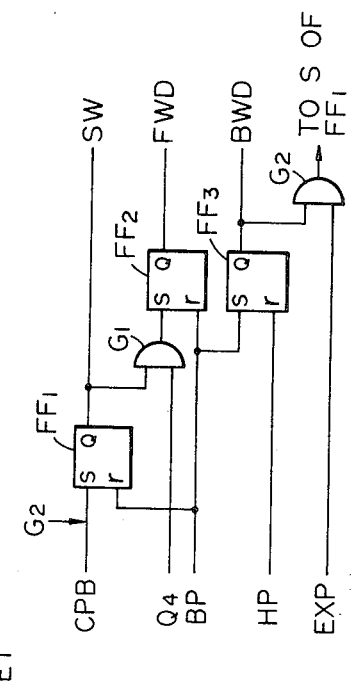
FIG. 7 is a diagram of a sequence control circuit pertaining to the scanning.
Figure 8:
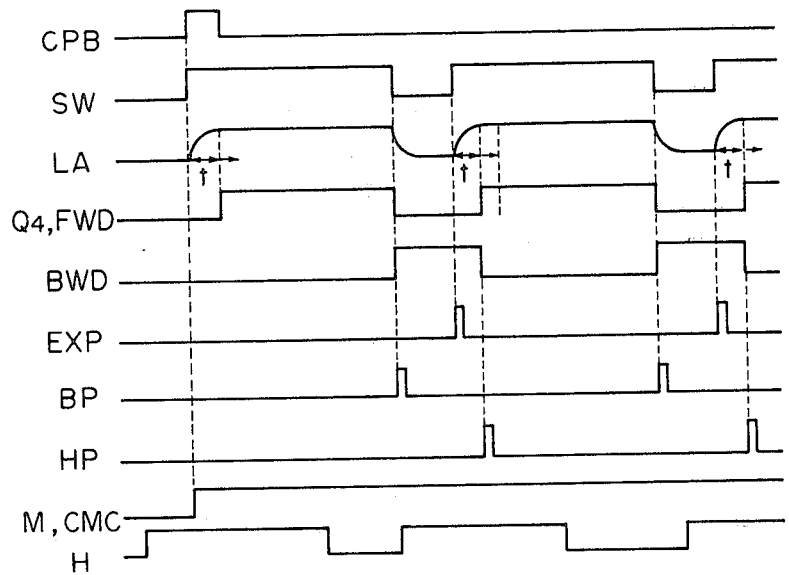
FIG. 8 is a time chart for FIG. 7.

FIGS. 5, 7 and 8 show the timing control for the scanning of the lamp in the copying machine of FIG. 1, and respectively are a fragmentary cross-sectional view corresponding to FIG. 1, a circuit diagram and a time chart. In FIG. 5, reference numerals 50, 52 and 53 denote reed switches provided in the reciprocal movement path of the platen. These reed switches are respectively disposed at a position just before the termination of the backward movement, at a position whereat the forward stroke (exposure) is terminated (the reversal position) and at a position whereat the backward stroke is terminated (the rest position). Designated by 51 is a magnet provided on the platen for actuating the above-mentioned reed switches in succession upon movement of the platen. This operation will now be described by reference to FIGS. 7 and 8.

In FIGS. 7 and 8, CPB is a signal which assumes 1 upon depression of the copy button CPB of FIG. 2, BP, HP and EXP are signals which assume 1 upon closing of the reed switches 52, 53 and 50, Q4 is a signal which assumes 1 in response to the high level from the comparator Q4 or Q14 of FIG. 4 or 6, SW is a signal for closing the lamp turn-on switch SW of FIG. 3 and energizing a relay as will later be described, FWD is a signal for energizing an advance motor for forwardly moving the platen for the exposure scanning, BWD is a signal for energizing a backing motor for backwardly moving the platen to its rest position after the termination of the exposure, and L shows the turn-on operation of the lamp. Designated by FF1-3 in FIG. 7 are flip-flops for setting the output Q by the signal to the input S and for resetting the output Q by the signal to the input R. G1 and G2 are AND gates.

When the copy button is depressed, the flip-flop FF1 is set by the signal CPB and the signal SW is put out to turn on the lamp LA. Thereafter, when the output of the comparator Q4 of FIG. 4 changes to high level after a predetermined time 5, the flip-flop FF2 is set through the gate G1 conjointly with the ON of the FF1. Then, the forward movement signal FWD is put out to forwardly move the platen to start the exposure scanning thereby. This time t corresponds to a time slightly longer than the time whereat the lamp has risen to its predetermined illumination. When the exposure is terminated and the platen reaches its reversal position, the magnet 51 actuates to close the reed switch 52, so that the forward moving flip-flop FF2 is reset by the signal BP and the signal FWD ceases to be put out and instead, the backward moving flip-flop FF3 is set to put out the signal BWD. Thus, the foward movement of the platen is stopped and the backward movement thereof is started. At the same time, the flip-flop FF1 is also reset, so that the signal SW ceases to be put out, thus turning off the lamp. During the backward movement of the platen, when the magnet passes by the reed switch 50, the signal EXP is generated to again set the FF1 through the gate G2 conjointly with the ON of the signal BWD, thus putting out the signal SW to turn on the lamp. When the platen reaches its initial or rest position, the signal HP is produced to reset the flip-flop FF3 and the signal BWD ceases to be put out, thus stopping the backward movement of the platen. Thereafter, when the comparator Q4 puts out high level, the flip-flop FF2 is set in the same manner as that already described and the signal FWD is put out to start the exposure operation again. In this manner, a number of copies set by a sheet number setting device SL (FIG. 2) are made from one and the same original. However, where a single copy is to be obtained, the AND signal of the inverted signal of the signal EXP and the copy end signal END may be applied to the gate G2 so that the lamp may not be turned on by EXP. Since the time whereat the comparator Q4 puts out high level is thus varied in accordance with the adjustment of the quantity of light effected by the VR2, the time whereat the forward movement signal FWD is started is also varied. Accordingly, if the time whereat the Q4 assumes high level when the backward movement is terminated is made to correspond to the case where the adjusted quantity of light is minimum, it is possible to start the forward movement as soon as the backward movement is terminated, and thus it is possible to enhance the copying speed. In this system, the scanning is not started correspondingly to the drum position and therefore, there is no limitation in the space for exposure. This leads to the best use of the features of a drum having a seamless photosensitive medium on its peripheral surface.

Although not shown, the feed timing of the transfer paper to the image transfer station by a roller 9 (FIG. 1) may be determined by the signal BP or by a separately provided reed switch. Also, the drum 6 continues to rotate at a predetermined velocity from after the ON of the signal CPB until at least the set number of copies has been completed or until the entire surface of the drum has been cleaned up after the completion of the set number of copies. Also, instead of using the reed switch 50, it is possible to operate a timer from the signal BP and put out this signal at a time which corresponds to the aforementioned signal EXP. The surface of the photosensitive drum is subjected to the positive primary charge by the charger 7 from after the time when the signal CPB is put out until the forward movement is started. Designated by M is a motor operating signal for rotating the drum, and H is a signal responsive to a temperature detector (not shown) for controlling the power supply to the heater of the fixing device 11 to maintain the fixing device at a predetermined temperature. The high level of each of these signals indicates the power supply.

In the present embodiment, it is also possible to turn on the lamp immediately after, before or simultaneously with the forward movement of the platen 2 being started, or during the returned platen 2 is in pause by HP where copying is repeated, a shock is imparted to the lamp when the platen 2 is returned to its initial position, but as the lamp is not yet turned on then, the life of the lamp is not aggravated.

Figure 10:
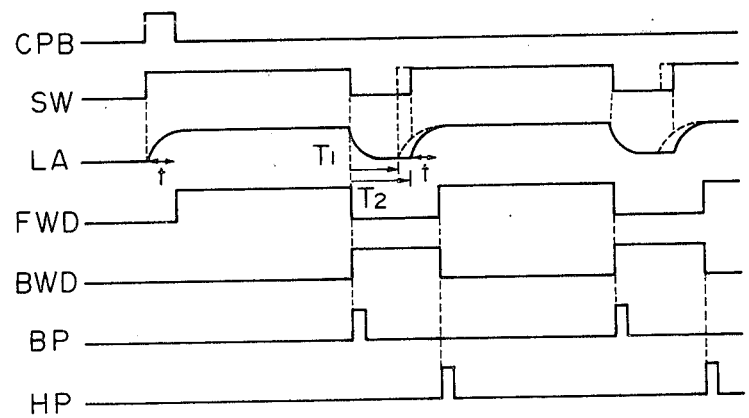
FIG. 10 is a time chart for FIGS. 11A and 11B.
Figure 11A:
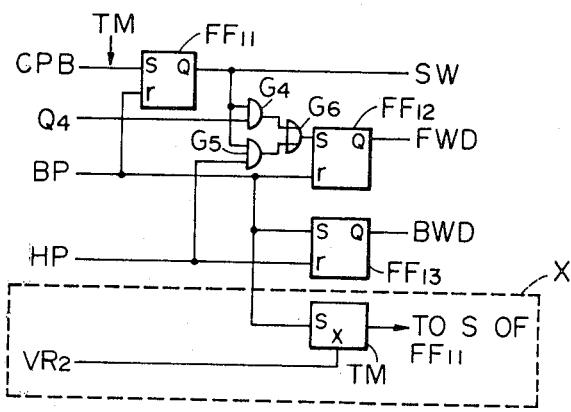
FIGS. 11A and 11B are diagrams of another control circuit pertaining to the scanning.
Figure 11B:
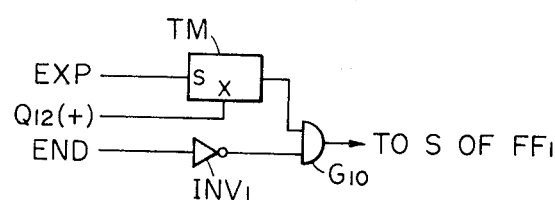

FIG. 10 and FIGS. 11A and 11B respectively show a time chart and circuit diagrams for controlling the lamp turn-on starting time in accordance with the adjustment of the quantity of light. Designated by FF11-FF13 are flip-flops similar to those already described, and TM is a timer which puts out 1 in a predetermined time after the application of 1 to the terminal S. That time is varied in accordance with the magnitude of the input level to X. That is, the lamp is turned on upon depression of the copy button CPB and after a time corresponding to the adjustment of the quantity of light, the signal FWD is put out, as already described, to start the exposure scanning, and after the termination thereof, when the signal BP is obtained at the reversal position, the signal BWD is put out to start the backward movement. The timer TM is set such that its time limit is short or T1 when the quantity of light by the quantity-of-light adjusting resistor VR2 is great, that its time limit is long or T2 when the quantity of light by the resistor VR2 is small, and that the time after the rising of the lamp corresponds to the time whereat the signal FWD is put out. Where the repeated copying is to be effected, the flip-flop FF11 is again set after the termination of the time limit of the timer TM to put out the signal SW and start to turn on the lamp. Immediately after predetermined illumination is reached, the platen returns to its original position to provide the signal HP. Thereupon, the flip-flop FF13 is reset and the flip-flop FF12 is set through gates G5 and G6 conjointly with the OFF of the signal BWD and the ON of the signal SW, whereby the signal FWD is again put out to start the exposure scanning.

A more preferable circuit is one in which the portion X of FIG. 11A is substituted for by the circuit of FIG. 11B. The time of the timer TM is determined by a signal imparted to the plus input of the operational amplifier Q12, namely, the absolute voltage signal. The time TM is started by the signal EXP of FIG. 7. Where a single copy is to be produced, the output of the gate G10 is blocked by the copy end signal END and therefore the flip-flop FF1 is not set. Consequently, the lamp is not repetitively turned on.

Where scanning for a first sheet of copy is started after the drum has made one full rotation for the cleaning thereof with the copy button depressed, it is possible to turn on the lamp during that idle rotation of the drum. Again in this case, if provision is made of another timer whose time limit is variable in accordance with the adjustment of the exposure and the time limit operation is started by the copy button so that the lamp is turned on with the time-up of that timer, it may contribute to a prolonged life of the lamp and economy of the electric power.

The present invention, as has hitherto been described, controls the voltage for the correction of the rising of the illumination in accordance with the amount of adjustment of the quantity of light or controls the time for starting to turn on the light source or the time for starting the exposure operation and can thus prevent irregularity of exposure when the light source has been turned on. Further, the present invention enables the work such as copy processing associated with the exposure to be started at an appropriate time, thus preventing any reduction in processing speed.

Figure 12:
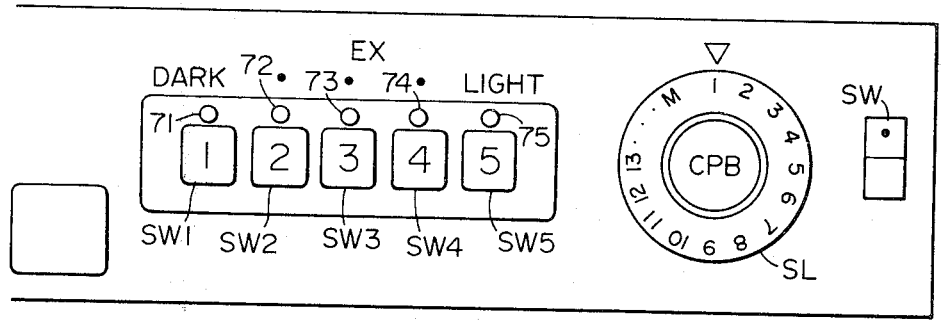
FIG. 12 is a plan view of another operating portion according to the present invention.

FIG. 12 shows an improvement over the operating portion of FIG. 2. Key buttons SW1–SW5 are buttons which may automatically return to their initial position after they are once depressed. Depression of the key button SW3 sets the density to the half-tone (standard), depression of the key button SW1 sets the density to "dark", and depression of the key button SW5 sets the density to "light". These settings may be displayed by light-emitting diodes 71–75. When the main switch SW is closed to supply power to the various parts of the copying machine, or for a predetermined time (several minutes) after a number of copies set by the dial SL has been produced from the same original, the light-emitting diode 73 is automatically turned on to set the density to the half-tone.

Figure 13A:
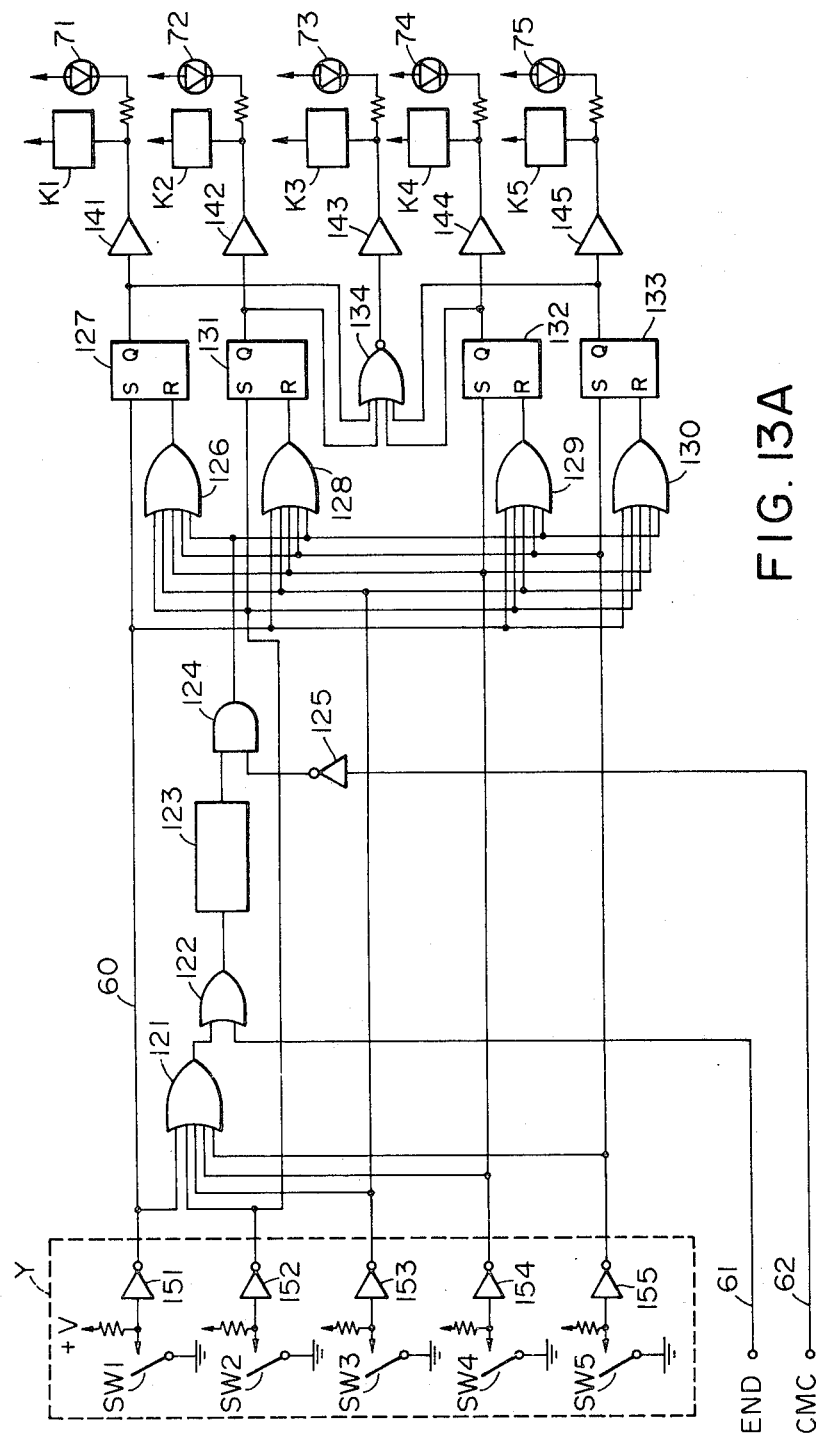
FIGS. 13A, 13B, 14A and 14B are diagrams of another exposure control circuit in the present invention.
Figure 13B:
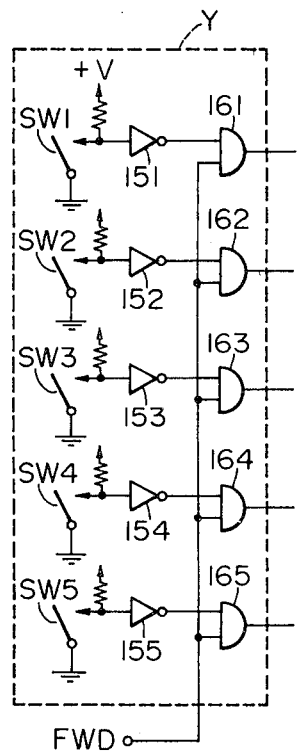

FIGS. 13A and 13B and FIG. 14 show an example of the exposure control circuit which will hereinafter be described.

In FIGS. 13A and 13B, K1–K5 designate relays for operating exposure adjusting contacts K1-1–K5-1 (FIG. 14). The relays K1–K5 are driven with the light-emitting diodes 71–75 by driver amplifiers 141–145. Designated by 127, 131, 132 and 133 are flip-flops which may be set by the application, to the S terminal, of an input signal resulting from the depression of the key buttons SW1–SW5 and may be reset by a signal to the R terminal. Denoted by 126, 128, 129 and 130 are OR gate circuits for sending the reset signal to these flip-flops. Reference numeral 123 designates a timer circuit which may be started upon falling of the input signal and may put out an output after a predetermined time limit. Designated by 121 and 122 are OR gates for sending the copy end signal END resulting from the depression of the switches SW1–SW5 to the timer 123. Reference numeral 124 denotes an AND gate, and 134 a NOR gate for setting the standard density. Designated by 125, 151–155 are inverters. Reference numeral 161 is a line for applying the copy end signal END, and 162 a line for applying a copy executing signal CMC.

Figure 14A:
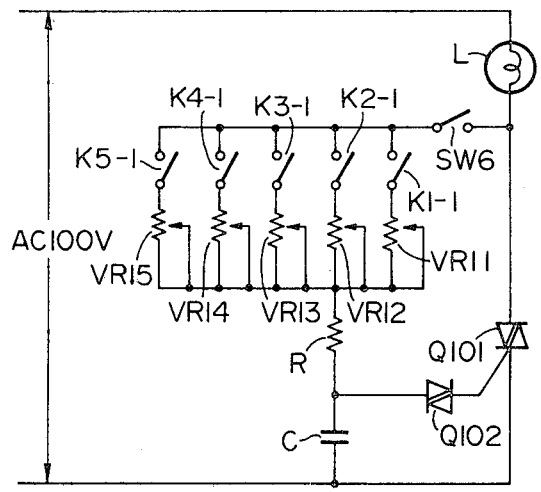

FIG. 14A shows a simple type of exposure control circuit. L is a halogen lamp, Q101 is a triac for controlling the lamp, and Q102 is a trigger diode for actuating the triac. R, C and VR11–VR15 respectively designate a fixed resistor, a capacitor and variable resistors for determining the conduction angle of the triac Q101. SW6 corresponds to the copy button CBP of FIG. 2 or 12 (which is held operative until completion of the copying). The variable resistors VR11–VR15 are those within the copying machine, but may be provided so as to be adjustable by the operating portion of FIG. 12.

Operation will now be described. Description is made with respect to a case where the key SW1 is depressed in FIG. 13A. When the key SW1 is depressed, 1 is put out from the inverter 151. The outputs of the inverters 152–155 of the other switch portions are all 0. The 1 signal from the inverter 151 sets the flip-flop 127 through a line 60, thereby causing the output Q thereof to be 1. By this, the relay K1 is driven to close its contact K1-1 in FIG. 14 and turn on the light-emitting diode 71. Further, the 1 signal on the line 60 is applied to the OR gates 128, 129 and 130 to render the outputs thereof to 1 and reset the flip-flops 131, 132 and 133. By this, the relays K2, K4 and K5 are deenergized. Since the output of the flip-flop 127 has become 1, the output of the NOR gate 134 becomes 0 and the relay K3 is not energized. These conditions are held even if the key SW1 is opened.

When the contact K1-1 is closed and the copy button SW6 is depressed, the necessary voltage divided by the variable resistor VR11 charges the capacitor C through the fixed resistor R. When the charge reaches a predetermined value, the charge of the capacitor C is discharged to the gate of the triac Q101 through the diode Q102, thus energizing the triac Q101. The timing of energization (conduction phase angle) of the triac Q101 is determined by the time constant of the time constant circuit VR1, R, C for each AC half waveform of AC 100 V. Here, the phase angle thereof is set to a small value, that is, the power supplied to VR1, R, C, Q102 and the lamp LA is reduced to decrease the quantity of light emitted by the lamp LA to make the image density high.

When the keys SW2–SW5 are selected, the flip-flop 127 is reset by the output of the gate 126 to deenergize the relay K1. The relays K2–K5 are energized to cause the triac Q101 to conduct at a predetermined phase angle determined by the time constant of the variable resistors VR12–VR15 in a similar manner. The resistance value of the resistor VR11 is greater than that of the resistor VR15 and accordingly, the conduction phase angle of the triac Q101 is small and consequently, the quantity of light emitted by the lamp LA becomes reduced.

Figure 14B:
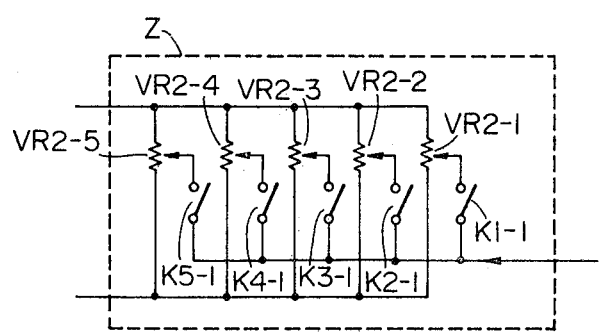

FIG. 14B shows a circuit in which the key entry circuit of FIG. 13 is used as the control circuit of FIGS. 4 and 6, and the circuit may be replaced by the portion Z. Designated by VR2-1–VR2-5 are variable resistors for presetting the levels of "dark" to "light".

Description will now be made of the operation effected after the copying by the exposure amount of the key button SW1 has been completed.

The 1 on the line 60 by the key SW1 renders the outputs of the OR gates 121 and 122 to 1. Since the output of the OR gate 122 fulls to 0 when the key SW1 is opened after being closed, the timer 123 puts out a pulse of 1 in a predetermined time T after this point of time. Therefore, if the copy button is left undepressed at this time, the copy signal CMC does not appear on the signal line 62, so that the output of the AND gate 124 is rendered to 1 by the output pulse of the timer circuit 123. This pulse is applied to the OR gates 126, 128, 129 and 130 to render the outputs thereof to 1 and reset the flip-flops 131, 132 and 133, thus rendering the output Q to 0. Therefore, the relays K1, K2, K4 and K5 are deenergized and the output of the NOR gate 134 becomes 1 to energize the relay K3. The signal CMC may preferably be a signal synchronous with the drum motor driving signal M of FIG. 8 or a signal which will continue from the starting time of the reciprocal movement till the generation of the last copy BP signal (FIG. 8). Also, the signal END may preferably be the last copy paper feed signal or the last BP signal in the single-sheet copying or the repeated copying.

On the other hand, when the copy button SW6 is depressed to start copying in the limited time T of the timer after the key SW1 has been depressed, the 1 of the copy signal CMC is applied to the line 62 to close the AND gate 124. Therefore, even after the limited time T has elapsed, the relay K1 continues to be energized to effect copying at a predetermined density.

When a predetermined number of copies has been completed, the copy end signal END is applied and on the signal line 61, 0 rises from the signal 1 to operate the timer circuit 123 through the OR gate 122 and, since the line 62 has already been rendered to 0, the flip-flops 127, 131, 132 and 133 are reset after the period time just in the same manner as described, and the relay K1 is deenergized while the relay K3 is energized, thus turning on the light-emitting diode 73. Thus, the contact K3-1 of FIG. 4-1 is closed and the apparatus is set to the standard exposure condition.

When copying is not effected in a predetermined time after copying has been terminated or in a predetermined time after the key SW1 has been depressed, the contact K3-1 for rendering the amount of exposure to the standard condition is closed in this manner to restore the standard exposure. When the keys SW2-SW5 are depressed, just the similar operation takes place to restore the standard exposure after a predetermined time, thus facilitating the operation and reducing the miscopying. However, it is preferable that the automatic restoration as described above not take place even if the copying is stopped when the paper 313 in a cassette 312 (FIG. 21) or the toner in the developing device 8 has become exhausted or when the paper 313 has jammed. The respective variable resistors VR11, VR12, VR13, VR14 and VR15 may be finely adjusted so as to provide a predetermined exposure amount by the selection of the key buttons, and such adjustments may be effected independently without affecting each other by arranging the circuit as shown in FIG. 14B. Further, by these variable resistor, the characteristic irregularity of the lamp LA and/or the characteristic irregularity of the elements C, Q102 and Q101 can be corrected.

Also, by making such a design that a pulse is generated by an unshown circuit when the main switch SW (FIG. 2) is closed and that the pulse is supplied to the output side of the gate 124, it is possible to set the exposure amount always to the standard exposure after the closing of the main switch. If the flip-flops FF127, 131, 132 and 133 are of the type which is reset upon opening of the main switch SW, the gate 134 puts out 1 simply upon closing of the switch SW, to thereby effect the above-described setting.

A more preferable circuit is one in which the portion Y of FIG. 13-1 is replaced by the circuit of FIG. 13B. In FIG. 13B, reference characters 161-165 denote AND gates for controlling the key entry. Keys SW1-SW5 are inhibited from entry as long as the scanning signal FWD (FIG. 7) is 1, and are allowed entry during the return of the optical system. By this, any malfunctioning resulting from an improper operation during the copying may be prevented, and the time during which the density can be altered is not restricted at random. During the duration of the signal CMC, the key entry may be inhibited.

Figure 15:
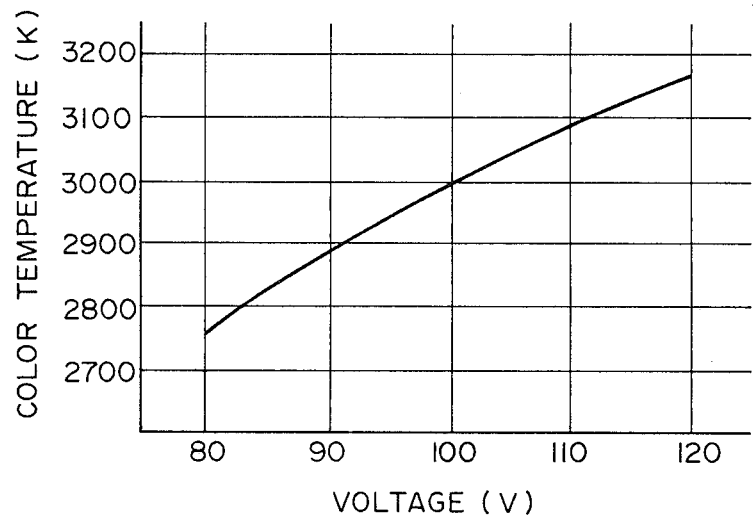
FIG. 15 is a graph illustrating the relation between the light source voltage and the light source color temperature.
Figure 16:
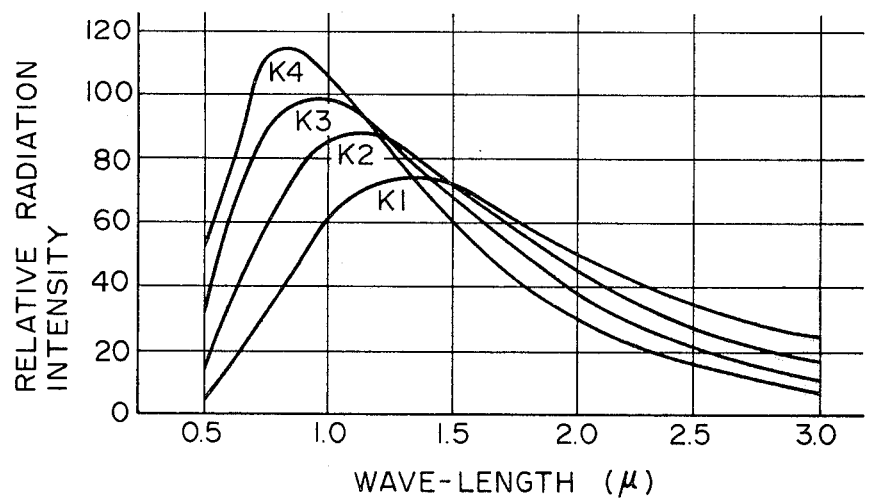
FIG. 16 is a graph illustrating the spectral distribution characteristic due to color temperature.
Figure 17:
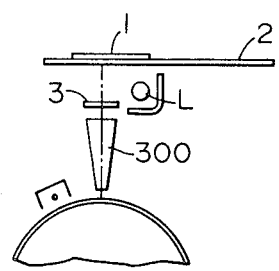
FIGS. 17 and 22 are fragmentary sectional views of another copying machine to which the present invention is applicable.

When the effective voltage applied to the halogen lamp LA of rated voltage 100 V is varied, the color temperature of the lamp LA is also varied as shown in FIG. 15. When the color temperature (higher in order of K1-K4) is varied, the spectral distribution characteristic of the lamp LA is also varied as shown in FIG. 16. When the original is multicolored, and when the exposure amount is great or when the exposure amount is small, the quantity of light reflected from the original does not become great or small generally in uniform proportion in the color of each wavelength of the multiple colors, but concabity is created in each wavelength. This means that the light and dark of a copy obtained when the exposure amount is great differ from the light and dark of a copy obtained when the exposure amount is small. For example, where a red and black original is to be copied by the use of a monochromatic copying machine, and because the colors of the original are generally light, it is assumed that it is desired to obtain a copy whose entire image surface is dark. In such a case, it is necessary to reduce the effective voltage to the lamp LA and thereby reduce the exposure amount. As a result, the color temperature of the lamp is varied as already noted, so that the spectral distribution characteristic is also varied to relatively reduce the energy of the visible light but the energy of the wavelength near the infrated light tends to be relatively great and therefore, in the black portion of the original, the quantity of reflected light becomes smaller in proportion to the above-mentioned operation, whereas the quantity of reflected light in the red portion does not become smaller in proportion to the aforementioned operation for the reason set forth above. Thus, the copy image of nearly red or red portion (having a long wavelength) becomes light.

Where the brightness of the light source is so varied by phase control, the spectral distribution characteristic of the light source is varied and this will adversely affect the copy image. To avoid this as shown in FIG. 1, a filter 3 for cutting the infrared rays (cutting long wavelengths) is inserted in the light path of the optical system. FIG. 17 shows such filter inserted in the light path of a copying machine in which exposure is effected through an optical fiber or a short-focus image forming element (cessfock lens or bar lens) 300. In FIG. 17, the other reference numerals are similar in significance to those in FIG. 1.

Figure 21:
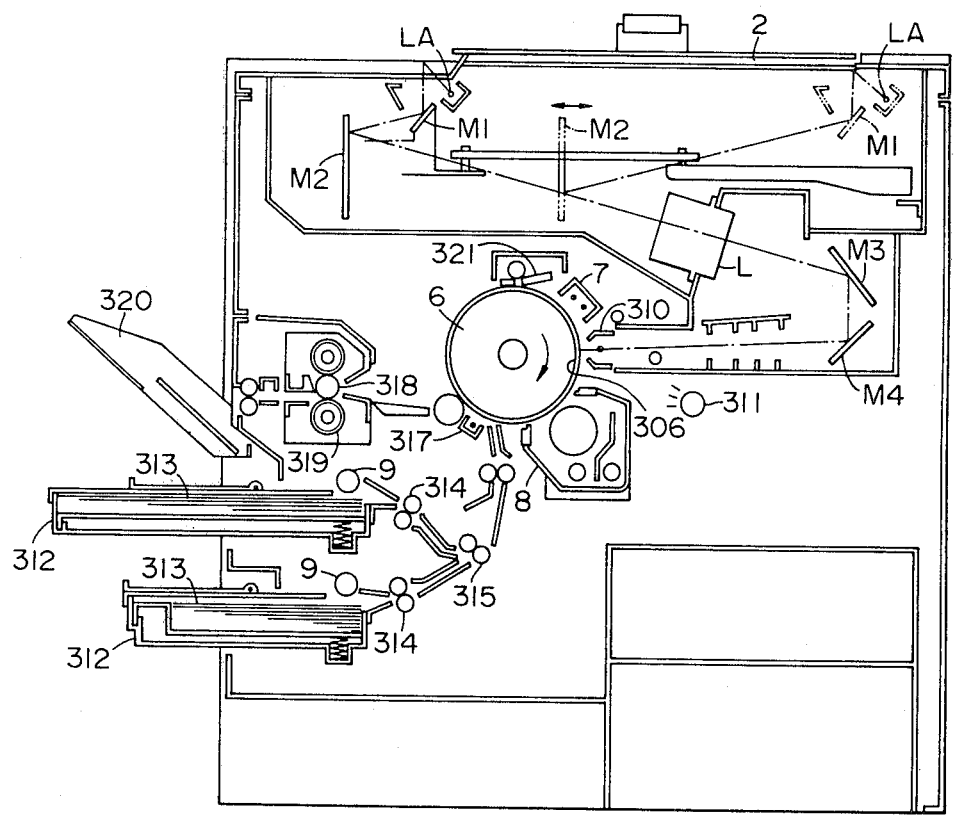
FIG. 21 is a cross-sectional view of another copying machine to which the present invention is applicable.
Figure 22:
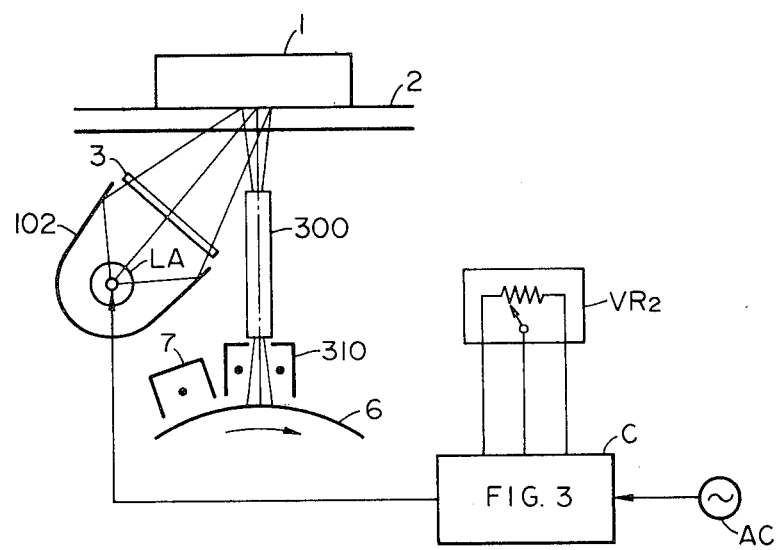

FIGS. 21 and 22 are cross-sectional views of a copying machine to which the present invention is applicable. The drum is rotatively driven in the direction of the arrow by a motor, not shown, and has, on the outer periphery thereof, a photosensitive medium 306 comprising an electrically conductive base layer, a photoconductive layer and a transparent surface insulating layer in succession. This photosensitive medium is first subjected to uniform charge by a corona discharger 7, the polarity of the charge being positive when the photoconductive layer is an N-type semiconductor and negative when the photoconductive layer is a P-type semiconductor.

An original placed on an original carriage glass 2 of FIG. 21 is illuminated by an illuminating lamp LA formed integrally with a first scanning mirror M1 and the reflected light therefrom is scanned by the first scanning mirror M1 and a second scanning mirror M2. The first scanning mirror M1 and the second scanning mirror M2 are moved at the velocity ratio of 1:1/2, whereby the scanning of the original is effected with the length of the light path forward of a lens L being always maintained constant. The reflected light image passes through the lens L and via a third mirror M3 and then via fourth mirror M4 and is focused on the drum 6 at an exposure station. By replacing the platen 2 of FIG. 5 with the mirror M, the sequence control of FIGS. 7 and 8 may be effected.

In the case of FIG. 22, the image of an original 1 placed on a transparent carriage 2 moved in the direction of arrow at the same velocity as the peripheral velocity of the drum 6 is exposed to light and this image is formed on the photosensitive medium of the drum by a short focus image forming element array 300. The photosensitive medium and the original carriage 2 are moved in a direction orthogonal to the direction of the linear arrangement of the small image forming elements of the array 300. The area of the original 1 to which the element array 300 is opposed, namely, the area whose image is formed on the photosensitive medium is illuminated by an illuminating system. This illuminating system has a light source LA such as halogen lamp and a reflector shade 302 disposed behind the light source. The reflector shade 302 causes that part of the light emitted from the light source LA which is not directly directed to the area of the original opposed to the array 300 to be reflected toward that area.

In the present invention, the amount of exposure for the photosensitive medium 306 is adjusted by adjusting the quantity of light emitted from the light source LA.

The photosensitive medium 306 is subjected to the image exposure by the element array 300 or by the mirror M4 and simultaneously therewith, subjected to the discharging action by an AC corona discharger 310 or by a corona discharger of the opposite polarity to the charger 7, whereby a charge pattern corresponding to the light image of the original 1 is formed on the photosensitive medium. The whole surface of the photosensitive medium is further subjected to uniform exposure by a lamp 311 to thereby form an electrostatic latent image of high contrast corresponding to the original image. The latent image thus formed is developed into a toner image by a developing device 8 of the magnet brush type or the like. Such toner image is transferred onto transfer paper 313 fed from a cassette 312 by a roller 9 and transported to the photosensitive medium 306 by rollers 314, 315. To enhance the transfer efficiency, charge of the opposite polarity to the toner forming the developed image is imparted to the back side of the transfer paper 313 at the image transfer station. This is effected by a corona discharger 317. Density adjustment may be accomplished also by controlling this charging voltage in the manner described previously. The toner image transferred onto the transfer paper 313 is heated and fixed by a pair of rollers 318, 319 urged against the transfer paper and containing heaters therein, and then the transfer paper is conveyed into a tray 320.

After the image transfer has been completed, the surface of the photosensitive medium is cleaned by an elastic blade 321 urged thereagainst to wipe off any residual toner thereon, thus becoming ready for another cycle of image processing.

The present embodiment can provide an image formation apparatus equipped with exposure amount adjusting means which is dimple and compact in construction so as not to hamper the compactness and simplification of the apparatus which is an important advantage obtained by the use of a small image forming element array. By coating the reflecting surface of the reflector shade or the incident light end surface of the array with a thin film for correcting the color temperature, it is possible to provide the aforementioned filter function.

Description will now be made of the exposure control in a copying machine wherein magnification may be changed.

Figure 18:
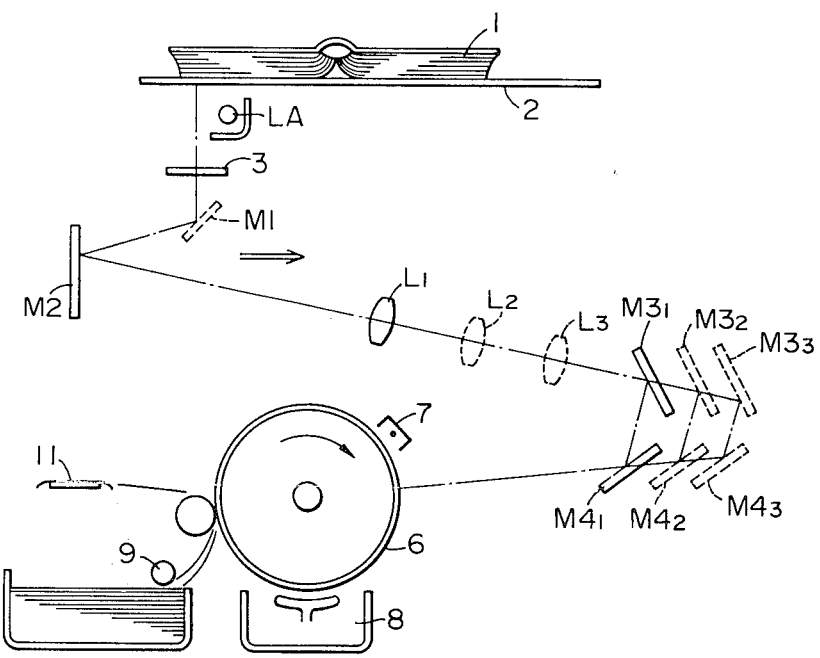
FIG. 18 is a schematic cross-sectional view of a copying macine having the magnification changing function.

FIG. 18 is a schematic cross-sectional view of a copying machine of the image transfer, fixed original carriage, slit exposure type which is provided with magnification changing means. An original 1 to be copied is placed on an original carriage glass 2 and it is scanned from below by a first mirror M1 in the rightward direction as viewed in the Figure. The movements of a second mirror M2, a third mirror M3 and a fourth mirror M4 are similar to those explained with respect to FIG. 21.

In the case of a first magnification $n_1$ (for example, one-to-one magnification), the lens, the third mirror and the fourth mirror lie at their solid line positions L1, M3$_1$ and M4$_1$, respectively, and at this time, they satisfy the following relation:

$$\begin{cases} \frac{1}{a_1} + \frac{1}{b_1} = \frac{1}{f} \\ \frac{b_1}{a_1} = n_1 \, (=1) \end{cases}$$

$$(i.e., a_1 = b_1 = 2f)$$

The scanning velocity of the first mirror M1 is $1/n_1 (=1)$ times the peripheral velocity of the photosensitive drum 3.

Next, in the case of a second magnification $n_2(<n_1)$, to satisfy the foregoing equations, the lens is moved to a position L2 which provides $a_2 = (1 + 1/n_2)f$ and the third and fourth mirrors are moved to positions M3$_2$ and M4$_2$, respectively, because the length of light path $(a_2 + b_2)$ is increased to $(1+n_2)(1+1/n_2)f$. At this time, it is not preferable that the imaging position is varied in the circumferential direction of the photosensitive drum 3 and therefore, to maintain the imaging position constant, the lens must be moved in a plane containing the optic axis thereof and perpendicular to the plane of the FIG. 18 sheet, and the third and fourth mirrors M3 and M4 must be parallel-moved as a unit in a plane bisecting the angle formed between the incident ray on the third mirror and the reflected ray from the fourth mirror. The ratio of the original scanning velocity of the first mirror M1 and the peripheral velocity of the photosensitive drum 3 is $1/n_2$, but it is not preferable in terms of the image producing process or the like that the peripheral velocity of the photosensitive drum 3 be varied and therefore, it is usual that the peripheral velocity of the photosensitive drum is kept at the same level as that in the case of the first magnification $n_1$ and that the original scanning velocity of the first mirror M1 is $n_1/n_2$ times.

In the case of the third magnification $n_3$, the lens, the third and the fourth mirror are moved to positions L3, M3$_3$ and M4$_3$, respectively, and the first mirror M1 scans the original at a velocity $n_1/n_3$ times the peripheral velocity of the photosensitive drum 3. By doing so, the original 1 can be copied at sizes corresponding to the magnifications $n_1$, $n_2$ and $n_3$.

In such a copying machine, it is necessary to effect the correction of the quantity of light corresponding to the magnification and the correction of the quantity of light corresponding to the desire.

Figure 19:
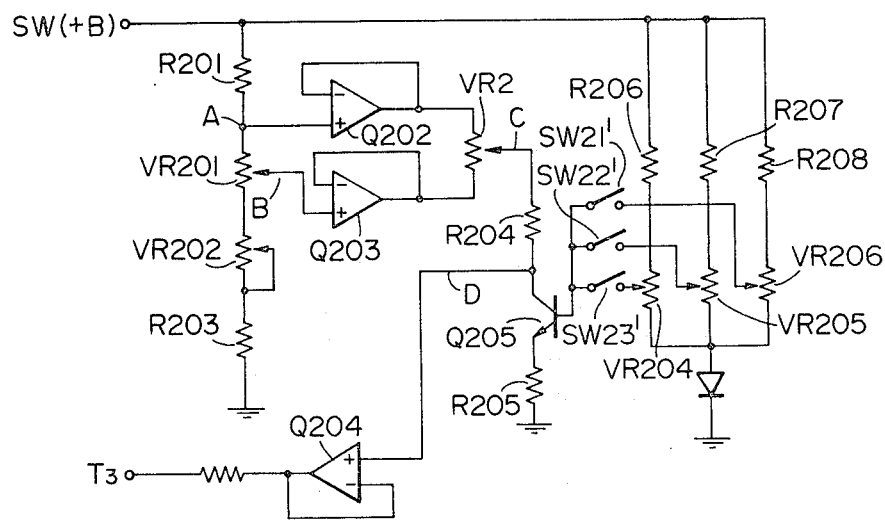
FIG. 19 is a diagram of another exposure control circuit in the present invention.

FIG. 19 shows a control circuit for maintaining the density of the reproduced image constant irrespective of the selection of magnification changing mode, and a stabilizing circuit is constituted by connecting various elements to provide the standard voltage to the differential amplifier B of the stabilizing circuit. Terminals +B and T3 are connected to the terminals +B and T3 shown in FIG. 2. Q202, Q203 and Q204 are operational amplifiers, each of which constitutes a voltage follower as shown and puts out the same voltage as the input voltage and effects impedance conversion. Q205 is a transistor which is driven by resistors R206, R207, R208, VR204, VR205 and VR206 connected to the base thereof through switches SW21'-SW23', and which flows a constant current to the collector thereof. Contacts SW21', SW22' and SW23' are for designating the copying magnification, and the contacts SW21', SW22' or SW23' is closed in accordance with the designated magnification.

Detailed description will now be made of the case where the copying magnification $n_1$ is selected. When the copying magnification $n_1$ is selected, the contact SW21' is closed as will hereinafter be described. At this time, voltages at points A and B voltage-divided by resistors R201, VR201, VR202 and R203 are put out as the outputs of the operational amplifiers Q202 and Q203.

The potential difference between the points A and B is applied across the variable resistor VR2 of the dial EX and the variable terminal C of the resistor VR2 indicates a certain voltage between the points A and B. Also, when the copying magnification $n_1$ is selected and the contact SW21 is closed, a certain constant current flows to the collector of the transistor Q205, namely, resistor R204, in accordance with resistors R208 nd R206 connected to the base thereof. Therefore, the collector potential of the transistor Q205 assumes a value of the point C minus the constant current and the voltage drop determined by the resistor R204. This value is put out to T3 through the voltage follower Q204. At this time, the variable resistor VR201 determines the potential at the point B. That is, it varies the voltage applied across the variable resistor VR2. The variable resistor VR2 can be set as desired in the variation range determined by the variable resistor VR201. Variable resistors VR206, VR205 and VR204 as the exposure amount correction and adjusting means are for reducing the potential at the point C set by the variable resistor VR2, by a predetermined value.

Thus, the standard voltage to T3 can be varied by variable resistors VR201, VR2, VR204, VR205 and VR206 and as a result, the effective voltage applied to the lamp LA can be varied to vary the exposure amount of the lamp LA.

Figure 20:
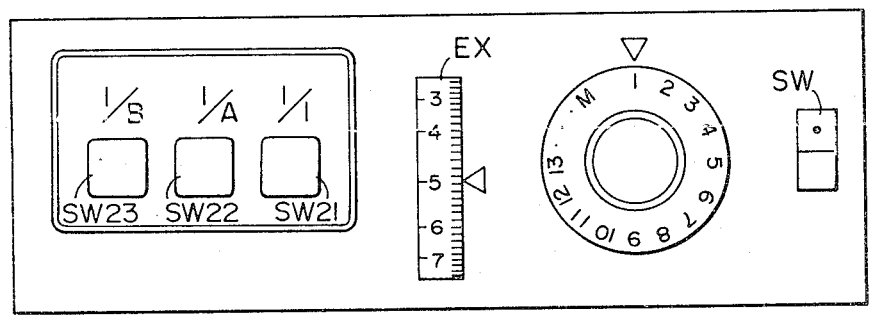
FIG. 20 is a plan view of the operating portion of the FIG. 18 copying machine.

FIG. 20 is a top plan view of the operating portion of a copying machine provided with a reduction mode. The main switch SW, the copy button CPB and the exposure adjusting dial EX are similar to those shown in FIGS. 2 and 12. Switches SW21-SW23 are for designating the copying magnifications (one-to-one, 1/A and 1/B). The contacts SW21', SW22' and SW23' in FIG. 19 are the contacts of the magnification setting switches themselves disposed on the operating panel or the contacts operable correspondingly to these switches. The contacts SW21'-SW23' may also be the contacts as shown in FIG. 14A which are held by the key buttons as shown in FIG. 12.

When the copying magnification $n_1$ (one-to-one magnification) is selected, the switch SW21 is depressed and correspondingly, the contact SW21' is closed. At this time, in FIG. 19, a current determined by R208 and VR206 flows to the base of the transistor Q205, and a potential lowered from the potential at point C by a predetermined value is put out to T1. That is, when $n_1$ is selected, there is put out a signal reduced in level from the potential set by VR2, by a predetermined value determined by R208 and R206.

On the other hand, when the copying magnification $n_2$ is selected, the contact SW22' is closed and there is put out a signal reduced in level from the potential set by VR2, by a predetermined value determined by R207 and VR205. At this time, when $n_1 > n_2$, and if a greater amount of level reduction is given for the magnification $n_2$ than for the magnification $n_1$, the potential at point C determined by the variable resistor VR2 can be uniformly reduced. Also, when the magnification $n_3$ is selected, there is likewise put out to T3 a signal reduced in level by a predetermined value determined by the variable resistor VR204 and the resistor R206. Thus, by varying the point C of the variable resistor VR2 disposed as the exposure dial EX on the operating panel, the output to T3 can be varied, and a signal reduced in level by a predetermined value can be put out to T1 by selecting copying magnification buttons SW21-SW23. The effective voltage of the lamp LA can be varied in accordance with the voltage at T3. It is also possible to use the keys of FIG. 12 instead of the dial EX of this copying machine and to apply the aforementioned rising correction control, the scan control and other controls to this copying machine.

Copying operation will now be described in conjunction with FIG. 20. For example, when the button SW21 in FIG. 20 is depressed to select the copying magnification $n_1$ (one-to-one magnification), the lens and mirrors are moved to the positions L1, $M3_1$ and $M4_1$, respectively. The variable resistor VR206 in FIG. 19, as already noted, is adjusted so as to provide a proper value for the center value of the exposure dial EX(VR2). The original 1 is placed on the optical system platen 2 and the user varies the exposure dial EX into a necessary value in accordance with the condition of the original 1, whereafter the copy button (not shown) is depressed to start the copying operation. Thereafter, the switch SW in FIG. 3 is closed to turn on the lamp LA.

The light from the lamp LA reflected by the original 1 passes through the filter 3 cutting the infrared rays (cutting the other lights than the visible light) and further through a lens L1 and via mirrors M1-M4 and is projected onto the photosensitive medium 6 to provide a reproduced image of one-to-one magnification in the manner already described.

Next, when the copying magnification $n_2(=1/A)$ is selected, the lens and mirrors assume their respective positions L2, $M3_2$ and $M4_2$. The variable resistor VR205 is adjusted so as to provide a proper value for the center value of the exposure dial EX. Thereafter, a copy of the same density as that during the one-to-one magnification is obtained just in the same manner as described with respect to the case of magnification $n_1$. Also, when the copying magnification $n_3(=1/B)$ is selected, the variable resistor VR204 is likewise adjusted so as to provide a proper value for the center value of the exposure dial EX, so that a copy can be obtained just in the same manner as described with respect to the cases of magnifications $n_1$ and $n_2$. Moreover, the dial is not moved at all and so, the allowance of density change is not infured. At this time, the variable resistors VR204, VR205 and VR206 as the exposure amount correction adjusting means during the change of the magnification may be adjusted entirely independently by designing the contacts SW21', SW22' and SW23' such that more than two of them are closed at a time. That is, the correction amount can be adjusted independently for each magnification. VR202 in FIG. 19 is for correcting the irregularity of the lamp LA, chiefly including the irregularities of the circuit elements.

According to the present invention, as has hitherto been described, the exposure amount correction during the copy mode change can be simply realized. Further, by providing exposure amount correction adjusting means, the setting of the density and the fine adjustment during maintenance by the operator may be effected independently and simply for each copying mode.

In the shown embodiment, three magnifications have been described, whereas the present invention is of course applicable to the case of two or four or more magnifications. Also, phase control is used as the exposure amount control means, but it is also possible to use the method of amplitude control or frequency control.

The present invention is applicable not only to copying machines having a variable magnification mechanism but also to copying machines such as color copiers having a manual color mode selector which enables the same original to be copied in different colors, and consequently copying machines having a plurality of copy modes using different exposure amounts.

Further, the techniques such as the fine adjustment of density, rising correction, voltage selection and sequence control are also applicable to the density control using the development bias voltage control or the corona charging voltage control.

It is also possible to reset the density to a standard density and reset the copy mode to a standard mode, such as one-to-one copy mode, at the time of the turn-on of the power switch, a predetermined time after the copy mode is set or a predetermined time after the termination of the copying operation, as shown in FIG. 13A. In addition, it is possible to prohibit the change of the mode of the magnification during the copying operation, as shown in FIG. 13B.

What we claim is:

1. An image formation apparatus comprising:
process means for forming an image on a recording medium;
first input means for manually setting the density of the image formed on said recording medium to a desired value;
first control means for controlling the power supplied to said process means in response to the setting of said input means to form the image of the desired density set by said input means;
second input means for adjusting said power; and second control means for controlling said first control means in response to said second input means to shift the range of the power controllable by said first control means while the variation rate of the density is substantially constant.

2. The image formation apparatus according to claim 1, further comprising means for adjusting the range of the power shifted by said second control means.

3. The image formation apparatus according to claim 1, wherein said process means is lamp means for illuminating a document, and said first control means controls the quantity of light emitted by said lamp means by controlling said power.

4. The image formation apparatus according to claim 1, wherein said first control means holds the power constant during the image formation.

5. An image formation apparatus comprising:
process means for forming an image on a recording medium;
input means for manually setting the density of the image formed on said recording medium to a desired value;
first control means for controlling the power supplied to said process means in response to the setting of said input means to form the image of the desired density set by said input means;
means for adjusting the range of the power settable by said input means; and
second control means for controlling said first control means to maintain the density set by said input means within the range adjusted by said adjusting means.

6. The image formation apparatus according to claim 5, wherein said process means is lamp means for illuminating a document, and said control means controls the quantity of light emitted by said lamp means by controlling said power.

7. A copying apparatus comprising:
a platen;
process means for forming an image on a recording medium on the basis of the image of a document on said platen, said process means including lamp means for illuminating the document on said platen;
means for applying a predetermined voltage to said lamp means to form the image of a desired density on said recording medium; and
means for applying to said lamp means a voltage not higher than the rated voltage of said lamp means, but higher than said predetermined voltage, in the initial turn-on stage to quicken the rising turn-on time of light of said lamp means.

8. The copying apparatus according to claim 7, wherein said voltage is applied for a different time or at a different level in accordance with the desired density.

9. A copying apparatus comprising:
a platen;
process means for forming an image on a recording medium on the basis of the image of a document on said platen, said process means including lamp means for illuminating the document on said platen;
input means for setting a desired image density;
means for applying a predetermined level of voltage to said lamp means to form the image of the desired density on said recording medium; and
means for applying to said lamp means an initial voltage for a different time or at a different level than said predetermined voltage in accordance with the different density settings, in the initial turn-on stage, to quicken the rising turn-on time of light of said lamp means for each different density setting.

10. A quantity-of-light control device comprising:
lamp means;
first input means for manually setting the quantity of light from said lamp means to a desired value;
source means for imparting an electrical power to said lamp means;
second input means for adjusting said power;
means for controlling said power imparted from said source means in response to said first input means to provide the quantity of light set by said input means; and second control means for controlling said first control means in accordance with said second input means to shift the range of the power controllable by said first control means while the variation rate of the quantity of light is substantially constant.

11. A copying apparatus comprising:

a platen;

process means for forming an image on a recording medium on the basis of the image of a document on said platen, said process means including lamp means for illuminating the document on said platen and a reciprocally movable member for scanning said document;

input means for setting the density of the image formed to a desired value;

means for controlling said process means by said input means to form the image of the desired density set by said input means; and means for controlling the operation starting time of said lamp means or of said reciprocally movable member in accordance with the set density to initiate the formation of the image in a short time corresponding to the density set by said input means.

12. A copying apparatus comprising:

a platen;

process means for forming an image on a recording medium on the basis of the image of a document on said platen, said process means including lamp means for illuminating the document on said platen and a reciprocally movable member for scanning said document;

means for effecting intermittent operation of said lamp means and said reciprocally movable member to repetitively scan said platen; and means for controlling the operation of said lamp means so that the conditions determining the turn-on start timing of said lamp means differ between the case of the initial scanning and the case of the later scanning to reduce the conventional turn-on time period of said lamp means.

13. The copying apparatus according to claim 12, further comprising input means for setting the density of the image formed to a desired value and means for controlling the power of said process means to form the image of the desired density set by said input means.

14. An image formation apparatus comprising:

process means for forming an image on a recording medium;

first input means for manually setting the density of the image to be formed to a desired value;

second input means for setting a copy magnification mode to a desired value;

first control means for controlling the power to be supplied to said process means in response to the settings of said first input means to form the image of the desired density set by said first input means; and second control means for controlling said first control means in accordance with said second input means to shift the range of power controllable by said control means while the variation rate of the quantity of light set by said first input means is substantially constant.

15. The image formation apparatus according to claim 14, wherein said process means is a lamp means for illuminating a document, and said first control means controls the quantity of light of said lamp means by the control of said power.

16. An image formation apparatus comprising:

process means for forming an image on a recording medium wherein said process means includes an exposure device;

key input means for setting the density of the image to be formed to a desired value;

means for displaying the density set by said key input means;

a memory for storing a signal corresponding to the density set by said key input means;

means for controlling the power applied to said exposure device in response to the setting of said key input means to form the image of the desired density set by said key input means; and second control means for causing said memory to hold said density signal during and after image formation and to change the memory signal of said memory by new operation of said key input means, without manually cancelling the original said memory signal, to change the desired density set by said key input means.

17. The image formation apparatus according to claim 16, wherein said exposure device is a lamp means for illuminating a document, and said control means controls the quantity of light emitted by said lamp means by the control of said power.

18. An image formation apparatus comprising:

process means, including an exposure device, for forming an image on a recording medium;

key input means for setting the density of the image formed to a desired value;

means for displaying the density set by said key input means;

a memory for storing a signal corresponding to the density set by said key input means;

means for controlling the power supplied to said exposure device in response to said key input means to form the image of the desired density set by said key input means, and for causing the memory to hold the density signal set by said key input means, before and after image formation; and means for enabling change of the density set by said key input means before the start of the image formation and for inhibiting the change of the density set by said key input means during the operation of the image formation.

19. The image formation apparatus according to claim 16 or 18, wherein said exposure device is a lamp means for illuminating a document, and said control means controls the quantity of light emitted by said lamp means of said power, and further comprising means for producing a standard density signal to form the image of a predetermined standard density without operation of said key input means when the main switch of said apparatus is closed.

20. An image formation apparatus comprising:

process means for forming an image on a recording medium;

key input means for setting the density of the image formed to a desired value;

means for displaying the density set by said key input means;

means for producing a standard density signal to form the image of a predetermined standard density without operation of said key input means; and means for controlling the power supplied to said process means in response to the setting of the key input signal of said key input means or the standard signal of said signal producing means to form the image of the desired density set by said key input means or the image of the standard density by said signal producing means, said control means including timer means operable in response to the operation of said key input means and the completion of the image formation, wherein said control means causes said signal producing means to operate in response to termination of the operation of said timer means.

21. The image formation apparatus according to claim 20, wherein said signal producing means produces said standard signal when the main switch of said apparatus is closed.

22. The image formation apparatus according to claim 20 or 21, wherein said signal producing means produces said standard signal after the formation of the image of the desired density, and said control means causes a memory to hold said density signal during and after image formation and to change the memory signal of said memory by new operation of said key input means, without manually cancelling the original said memory signal, to change the desired density set by said key input means.

23. The image formation apparatus according to claim 20 or 21, wherein said signal producing means produces said standard signal when a predetermined time elapses after the operation of said key input means, and said control means enables the change of the density set by said key input means before the start of the image formation and inhibits the change of the density set by said key input means during the operation of the image formation.

24. A copy apparatus comprising:

a platen;

process means for forming an image on a recording medium on the basis of the image of a document on said platen, said process means including lamp means for illuminating the document on said platen, and an optical fiber element array for forming on a light-receiving member the optical image of the document illuminated by said lamp means;

means for controlling the power of said lamp means to control the quantity of light emitted by said lamp means to form the image of a predetermined density on said recording medium; and a correction filter provided in the light path of said lamp means to correct the spectral distribution of said optical image varied by the control of the power effected by said control means.

25. The image formation apparatus according to claim 20 or 21 wherein said process means includes an exposure device, and said control means controls the power applied to said exposure device in response to the setting of said key input means.

* * * * *